(12) United States Patent
Millar et al.

(10) Patent No.: US 8,934,533 B2
(45) Date of Patent: Jan. 13, 2015

(54) METHOD AND APPARATUS FOR CONTROLLING A VIDEO SURVEILLANCE DISPLAY

(75) Inventors: Greg Max Millar, Coarsegold, CA (US); Samuel Nikolay Grigorian, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 1994 days.

(21) Appl. No.: 10/988,231

(22) Filed: Nov. 12, 2004

(65) Prior Publication Data

US 2006/0104345 A1 May 18, 2006

(51) Int. Cl.
| | |
|---|---|
| H04N 11/02 | (2006.01) |
| H04N 11/04 | (2006.01) |
| H04B 1/66 | (2006.01) |
| H04N 19/587 | (2014.01) |
| G08B 13/196 | (2006.01) |
| H04N 7/18 | (2006.01) |
| H04N 21/2187 | (2011.01) |
| H04N 21/234 | (2011.01) |
| H04N 21/431 | (2011.01) |
| H04N 21/44 | (2011.01) |
| H04N 21/442 | (2011.01) |
| H04N 21/462 | (2011.01) |
| H04N 21/6377 | (2011.01) |
| H04N 21/658 | (2011.01) |
| H04N 21/6587 | (2011.01) |
| H04N 21/845 | (2011.01) |
| H04N 19/152 | (2014.01) |
| H04N 19/132 | (2014.01) |
| H04N 19/44 | (2014.01) |
| H04N 19/172 | (2014.01) |
| H04N 19/159 | (2014.01) |
| H04N 19/61 | (2014.01) |

(52) U.S. Cl.
CPC .... *H04N 19/00751* (2013.01); *G08B 13/19667* (2013.01); *G08B 13/19673* (2013.01); *G08B 13/09693* (2013.01); *H04N 7/181* (2013.01); *H04N 21/2187* (2013.01); *H04N 21/23406* (2013.01); *H04N 21/431* (2013.01); *H04N 21/44004* (2013.01); *H04N 21/4424* (2013.01); *H04N 21/4621* (2013.01); *H04N 21/6377* (2013.01); *H04N 21/658* (2013.01); *H04N 21/6587* (2013.01); *H04N 21/8453* (2013.01); *H04N 19/00193* (2013.01); *H04N 19/00127* (2013.01); *H04N 19/00533* (2013.01); *H04N 19/00266* (2013.01); *H04N 19/00218* (2013.01); *H04N 19/00781* (2013.01)
USPC .................................................. 375/240.01

(58) Field of Classification Search
None
See application file for complete search history.

(56) References Cited

U.S. PATENT DOCUMENTS 5,619,995 A * 4/1997 Lobodzinski ................. 600/425
5,719,632 A 2/1998 Hoang et al.
(Continued)

FOREIGN PATENT DOCUMENTS

| GB | 2275585 | 8/1994 |
|---|---|---|
| GB | 2348072 A | 9/2000 |
| JP | 2004282390 A | 10/2004 |

*Primary Examiner* — Nhon Diep
(74) *Attorney, Agent, or Firm* — Hunter Clark PLLC (57) ABSTRACT

A method and apparatus for controlling a video surveillance display comprising receiving an MPEG video stream comprising video data in I-frames and P-frames, storing the MPEG video stream in an input buffer, displaying the stored MPEG video stream in full-motion video, monitoring the amount of video data stored in the input buffer; and displaying only the I-frames of the stored MPEG video stream when the amount of video data stored in the input buffer is greater than a predetermined amount.

16 Claims, 9 Drawing Sheets

(56) References Cited

U.S. PATENT DOCUMENTS

| | | | |
|---|---|---|---|
| 5,822,324 A * | 10/1998 | Kostresti et al. | 370/487 |
| 5,847,771 A | 12/1998 | Cloutier et al. | |
| 6,011,868 A * | 1/2000 | van den Branden et al. | 382/233 |
| 6,141,491 A | 10/2000 | Yamagishi et al. | |
| 6,269,120 B1 * | 7/2001 | Boice et al. | 375/240.12 |
| 6,317,164 B1 | 11/2001 | Hrusecky et al. | |
| 6,724,403 B1 * | 4/2004 | Santoro et al. | 715/765 |
| 7,636,931 B2 * | 12/2009 | Gatto et al. | 725/82 |
| 2003/0014752 A1 | 1/2003 | Zaslavsky et al. | |

\* cited by examiner

METHOD AND APPARATUS FOR CONTROLLING A VIDEO SURVEILLANCE DISPLAY

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates generally to surveillance systems and, in particular, to a method and apparatus for controlling a video surveillance display.

Displaying the video data gathered by video surveillance systems has been a challenge because of the large amount of data involved. If the video data is compressed, such as with MPEG video, the system must first decompress or decode the video before it can be displayed. This decompression can require a significant amount of system resources and time. In order to display multiple compressed video streams, the system must be capable of handling the multiple decompressions. Depending upon the number of video streams to be displayed simultaneously, the resolution of each stream, and the frame rate requested by the system user for each displayed video stream, the system resources can quickly be exceeded. Full-motion video provides the most information and is preferred by many users. However, the amount of system resources required to display a plurality of video streams in full-motion video can be significant thereby further taxing the system resources. With intraframe encoded images, such as JPEG images, each one is independent so that if the system is displaying a series of JPEG images and finds that it cannot handle the frame per second rate, then the system can simply display every other image or every third or fourth image depending on the current limitation of the system resources. With MPEG video, the system has to be able to decode the whole stream. If the system falls behind, you cannot eliminate some of the data by simply displaying every other image as is done with an intraframe encoded stream. As a result, the system ends up with more video data coming in than is being processed which can result in the system crashing. In addition, temporary overloads of the system can result, for example, from a burst of data caused by network traffic or interruption of system processing power caused by internal system processes or a user's request. These temporary overloads can be extremely troublesome if the system resources are stretched to the maximum. A system crash or significant reduction in the level of service is unacceptable in the video surveillance environment where continuous operation and the maximum possible amount of information is required.

Accordingly, there has been a long felt need in the video surveillance industry for a video surveillance system that maximizes the amount of video information displayed while minimizing interruptions of the displayed video.

SUMMARY OF THE INVENTION

In accordance with the present invention there is provided a method of controlling a video surveillance display comprising the steps of receiving an MPEG video stream comprising video data in I-frames and P-frames, storing the received MPEG video stream in an input buffer, displaying the stored MPEG video stream in full-motion video, monitoring the amount of video data stored in the input buffer, and displaying only the I-frames of the stored MPEG video stream when the amount of video data stored in the input buffer is greater than a predetermined amount.

In accordance with the present invention there is also provided a method of controlling a video surveillance display comprising the steps of receiving a plurality of MPEG video streams comprising video data in I-frames and P-frames, receiving a request for the mode in which the received MPEG video streams are to be displayed with at least one of the MPEG video streams requested to be displayed in full-motion video, displaying the MPEG video streams in the input buffer according to the received request, monitoring the amount of video data in the input buffer, determining the number of MPEG video streams that can be displayed in full-motion video and not cause the amount of video data stored in the input buffer to exceed a predetermined amount, and displaying only the number of MPEG video streams determined in the determining step in full-motion video and the remainder of the MPEG video streams in I-frame mode.

In another aspect of the present invention there is provided a method of controlling a video surveillance display comprising the steps of receiving a plurality of MPEG video streams comprising I-frames and P-frames, receiving an input requesting the number of streams to be displayed on a display screen at the same time and the number of screens to be displayed in full-motion video, determining the number of streams that can be displayed in full-motion video with the remainder of the requested streams being displayed in I-frame mode, and displaying some of the requested number of streams in full-motion video and the remainder in I-frame mode.

In still another aspect of the invention there is provided a method of controlling a video surveillance system comprising the steps of sending video data comprising full-motion video from a video source, receiving the video data at a location, storing the received video data in an input buffer, displaying the stored video data as full-motion video, determining when the amount of video data stored in the input buffer is greater than a predetermined level, notifying the video source to send only I-frames when the amount of video data stored in the input buffer is greater than the predetermined level, separating the I-frames from the MPEG video data at the video source, sending video data consisting of only I-frames, receiving the video data from the source consisting of only I-frames, storing the video data consisting of only I-frames in the video buffer, and displaying the I-frames stored in the video buffer.

A further aspect of the invention provides a method of controlling a video surveillance system comprising the steps of sending video data comprising full-motion video from a video source, receiving the video data at a location, storing the received video data in an input buffer, displaying the stored video data as full-motion video, determining if the rate that video data is being stored in the input buffer is less than a predetermined level, notifying the video source to send only I-frames when the rate of video data being stored in the input buffer is less than the predetermined level, separating the I-frames from the MPEG video data at the video source, sending video data consisting of only I-frames, receiving the video data from the source consisting of only I-frames, storing the video data consisting of only I-frames in the video buffer, and displaying the I-frames stored in the video buffer.

Another aspect of the present invention provides an apparatus for controlling a video surveillance display comprising an input for receiving an MPEG video stream comprising video data in I-frames and P-frames, an input buffer for storing the received MPEG video stream, and a processor for monitoring the amount of video data stored in the input buffer. The processor provides a signal for displaying the stored MPEG video stream in full-motion video if the amount of video data stored in the input buffer is less than a predetermined amount and for displaying only the I-frames of the stored MPEG video stream when the amount of video data stored in the input buffer is greater than the predetermined amount.

In still another aspect of the present invention there is provided an apparatus for controlling a video surveillance display comprising an input for receiving a plurality of MPEG video streams comprising video data in I-frames and P-frames, an input for receiving a request for the mode in which the received MPEG video streams are to be displayed with at least one of the MPEG video streams requested to be displayed in full-motion video, an input buffer for storing the received MPEG video streams, and a processor for providing a signal for displaying the MPEG video streams stored in the input buffer according to the received request. The processor monitors the amount of video data in the input buffer and determines the number of MPEG video streams that can be displayed in full-motion video and not cause the amount of video data stored in the input buffer to exceed a predetermined amount. The processor changes the signal to display only the determined number of MPEG video streams in full-motion video and the remainder of the MPEG video streams in I-frame mode.

In addition, in accordance with the present invention there is provided an apparatus for controlling a video surveillance display comprising an input for receiving a plurality of MPEG video streams comprising I-frames and P-frames, an input for receiving a request for the number of streams to be displayed on a display screen at the same time and the number of screens to be displayed in full-motion video, and a processor for determining the number of streams that can be displayed in full-motion video with the remainder of the requested streams being displayed in I-frame mode. The processor provides a signal for displaying some of the requested number of streams in full-motion video and the remainder in I-frame mode.

Still further, the present invention provides a video surveillance system comprising a network, a video source for providing an MPEG video stream comprising I-frames and P-frames connected to the network, the video source being able to separate the video stream into I-frames and P-frames, and a workstation connected to the network and comprising an input buffer for storing video data received from the network and a processor. The workstation monitors the amount of video data in the input buffer and sends a signal to the video source to provide only I-frames when the amount of video data in the input buffer is greater than a predetermined amount.

The present invention also provides a video surveillance system comprising a network, a video source for providing an MPEG video stream comprising I-frames and P-frames connected to the network, the video source being able to separate the video stream into I-frames and P-frames, and a workstation connected to the network and comprising an input buffer for storing video data received from the network and a processor. The workstation monitors the rate that video data is being stored in the input buffer and sends a signal to the video source to provide only I-frames when the rate that video data is being stored in the input buffer is less than a predetermined amount.

Other advantages and applications of the present invention will be made apparent by the following detailed description of the preferred embodiment of the invention.

DETAILED DESCRIPTION OF THE INVENTION

Figure 1:
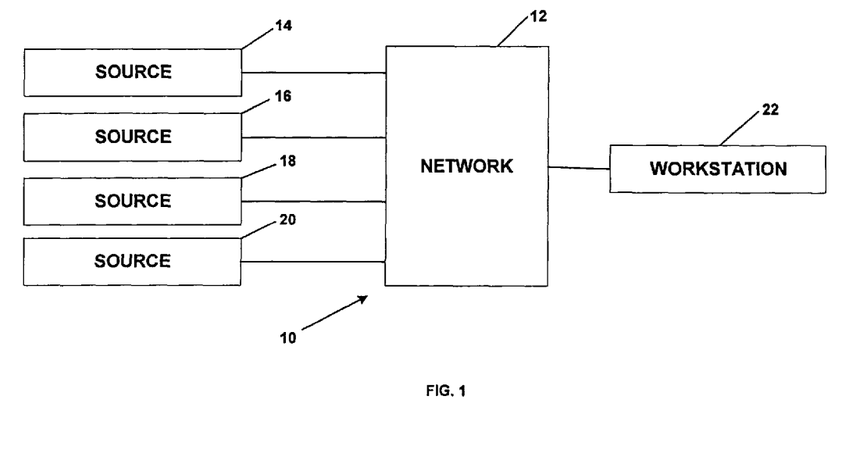
FIG. 1 is a block diagram of a video surveillance system utilizing the present invention.

Referring to FIG. 1, a video surveillance system 10 has a network 12 which can be a closed network, local area network, or wide area network, such as the Internet. A plurality of video sources 14, 16, 18, and 20, which can be, for example, video cameras or digital video recorders, are connected to network 12 to provide real-time or playback MPEG video streams, such as MPEG4 video streams. Workstation 22, which can be, for example, a control point in surveillance system 10, a personal computer or a user logged into surveillance system 10 by means of a laptop computer, is connected to network 12. Sources 14, 16, 18, and 20 provide MPEG video streams to workstation 22 via network 12.

Figure 2:
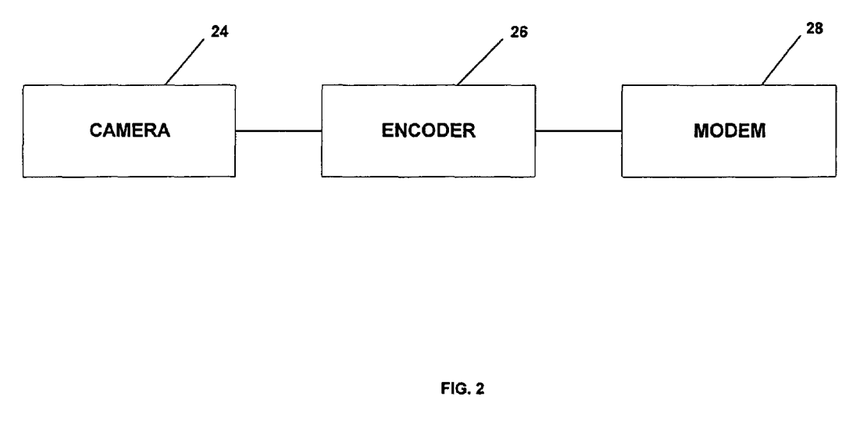
FIG. 2 is a block diagram of an exemplary video source in the video surveillance system shown in FIG. 1.

An exemplary video source is illustrated in FIG. 2 in block diagram form. Camera 24 provides its output to encoder 26, which in turn provides an MPEG video stream to modem 28 for transmitting to network 12. It is to be understood that although camera 24, encoder 26, and modem 28 have been shown as separate devices, their functions can be provided in a single device or in two devices rather than three separate devices as illustrated.

Figure 3:
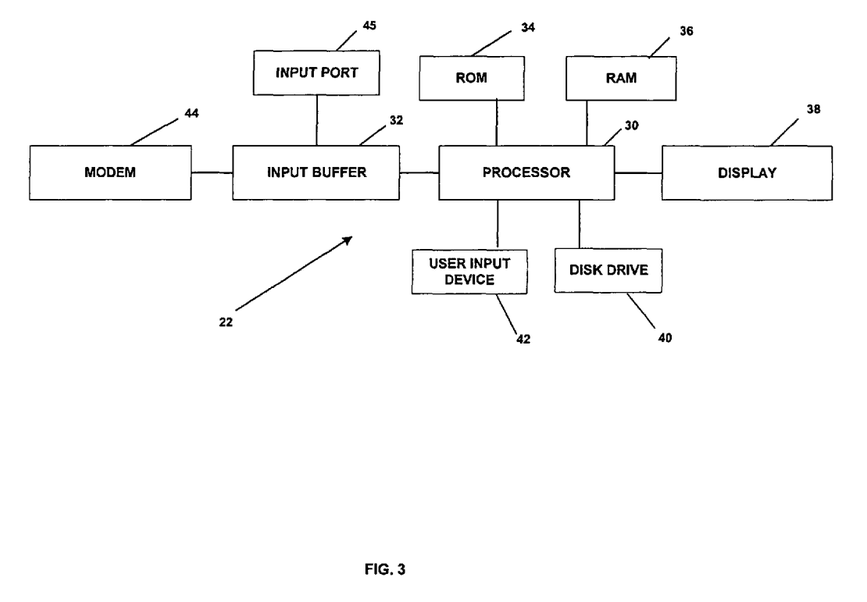
FIG. 3 is a block diagram of an exemplary workstation in the video surveillance system shown in FIG. 1.

With reference to FIG. 3, an exemplary workstation of the present invention is shown in block diagram form. Workstation 22 has a processor 30 which is connected to input buffer 32, ROM 34, RAM 36, display 38, disk drive 40 and user input device 42. Processor 22 can be a central processing unit or a digital signal processor or both. User input device 32 can be a controller, keyboard, or other suitable input device. Processor 22 implements algorithms and programs that are stored in ROM 34 or disk drive 40 in response to user input from user input device 42 and provides output signals to display 38. Modem 44 is connected to network 12 and receives the MPEG video streams from sources 14, 16, 18, and 20 in FIG. 1. Modem 44 provides the MPEG video streams to input buffer 32. The video stream data can be stored in a partition of disk drive 40 according to the method of the present invention. Input port 45, which can be, for example, a USB or FireWire port, can also provide video streams to input buffer 32. Alternatively, processor 30 can have its own input buffers, or a portion of RAM 36 can be used as an input buffer. In addition, disk drive 40 can be a video source as described herein.

Figure 4:
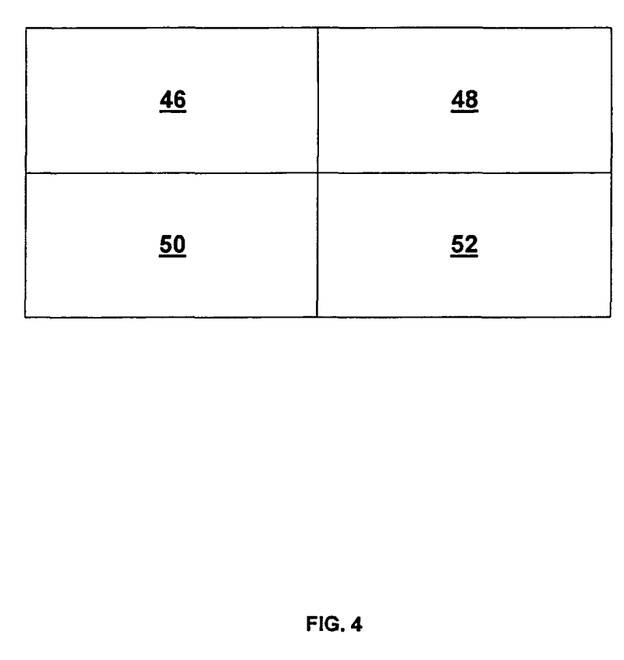
FIG. 4 is a diagram illustrating an exemplary display.

User input device 42 provides user input to processor 30, such as instructions concerning the number of video streams to be displayed on display 38, the resolution of each portion of the display, and whether the stream is to be displayed in full-motion video or another format. FIG. 4 shows an exemplary display on the screen of display 38 having four separate quadrants labeled 46, 48, 50, and 52, which could, for example, contain video streams from sources 14, 16, 18, and 20 respectively. It is to be understood that numerous other display configurations are possible depending upon the needs of the user and the system capabilities, for example, dividing the screen into nine or sixteen equal-sized boxes or dividing quadrant 46 into four equal-sized boxes while maintaining quadrants 48, 50, and 52 in their original size.

Figure 5:
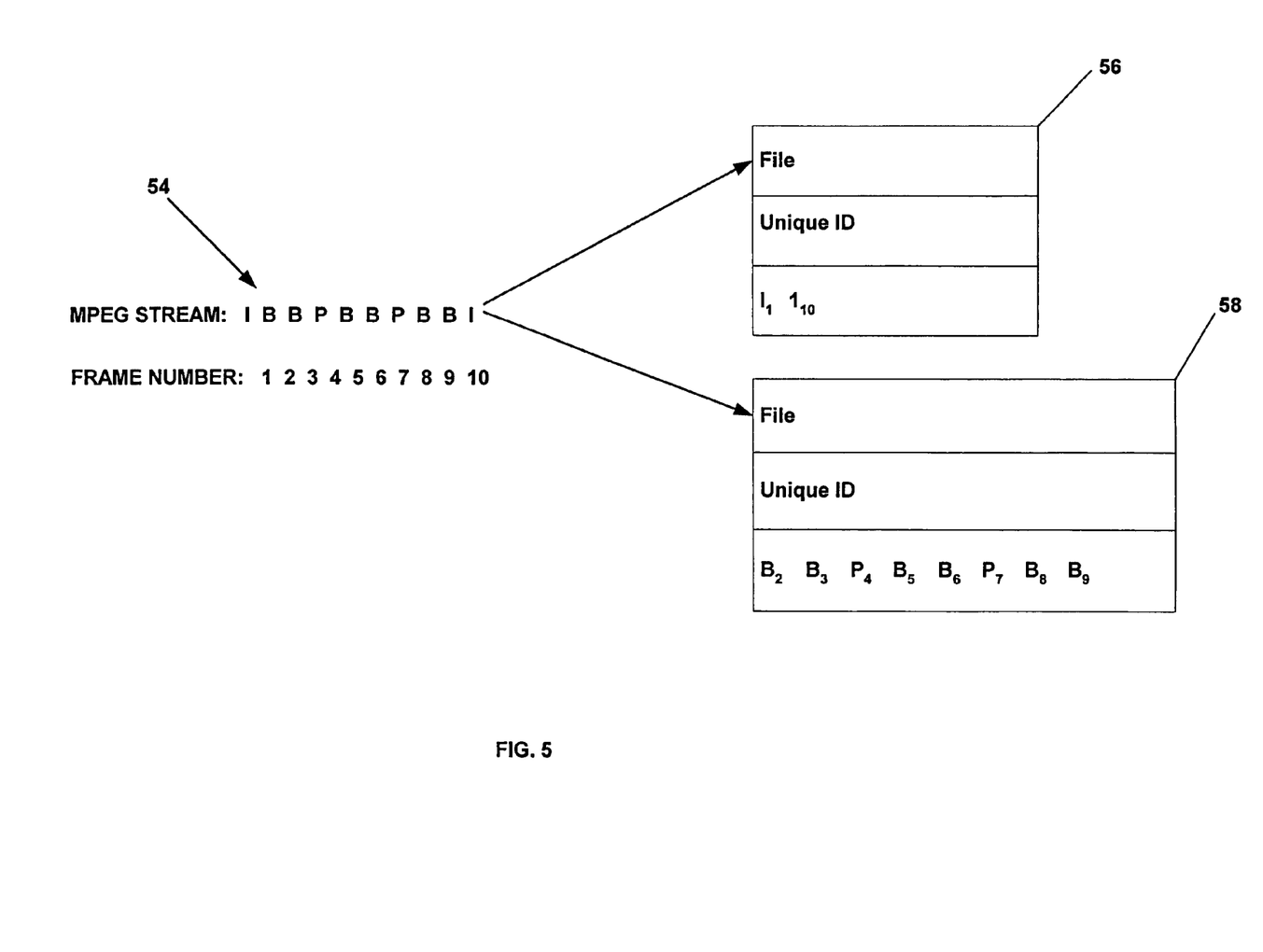
FIG. 5 is a diagrammatic block diagram illustrating the processing of an MPEG stream according to the present invention.

FIG. 5 illustrates an exemplary MPEG stream 54 from sources 14, 16, 18, and 20. MPEG stream 54 consists of a series of data frames encoding pictures. The three types of data frames are I-frames, P-frames, and B-frames. I-frames are encoded as a single image with no reference to any past or future frames. P-frames (predictive) are encoded relative to the past reference frame, which can be a P-frame or I-frame. The past reference frame is the closest preceding reference frame. B-frames (bidirectional predictive) are encoded relative to the past reference frame, the future reference frame, or both frames. The future reference frame is the closest following reference frame, either I-frame or P-frame. The series of frames, which is referred to in the art as a Group of Pictures (GOP), can take many different configurations, and, as stated above, MPEG video stream 54 is merely exemplary. The ratio of I-frames, P-frames, and B-frames is determined by the nature of the video stream and the bandwidth constraints of the network and system. In addition, the time required for encoding the video stream may also affect the ratio. MPEG video stream 54 is shown as having B-frames, although an MPEG stream consisting of only I-frames and P-frames has been found to be satisfactory for video surveillance system purposes.

MPEG video stream 54 is separated into two separate files, file 56 and file 58, by processor 30 of workstation 22. Alternatively, other circuitry could be used as a video stream separator. Processor 30 determines the frame type by examining the frame headers. File 56 contains only I-frames, and file 58 contains P-frames and B-frames. As discussed above, MPEG video stream 54 may not contain B-frames, and thus file 56 would contain only P-frames. Files 56 and 58 each have a unique identifier, which can be in the header of the respective files and can be a unique time stamp provided by processor 30. Processor 30 also provides each frame with a sequential frame number, (indicated as 1 through 10 in FIG. 5) so that files 56 and 58 can be combined by processor 30 to provide full-motion video in response to a request from user input device 42. The I-frames are independent images that are similar to JPEG images. Therefore, if the system cannot handle the full-motion video, just the I-frames can be displayed at whatever frame rate can be handled based on the current system demands, for example, from three frames per second up to thirty frames per second.

Figure 6:
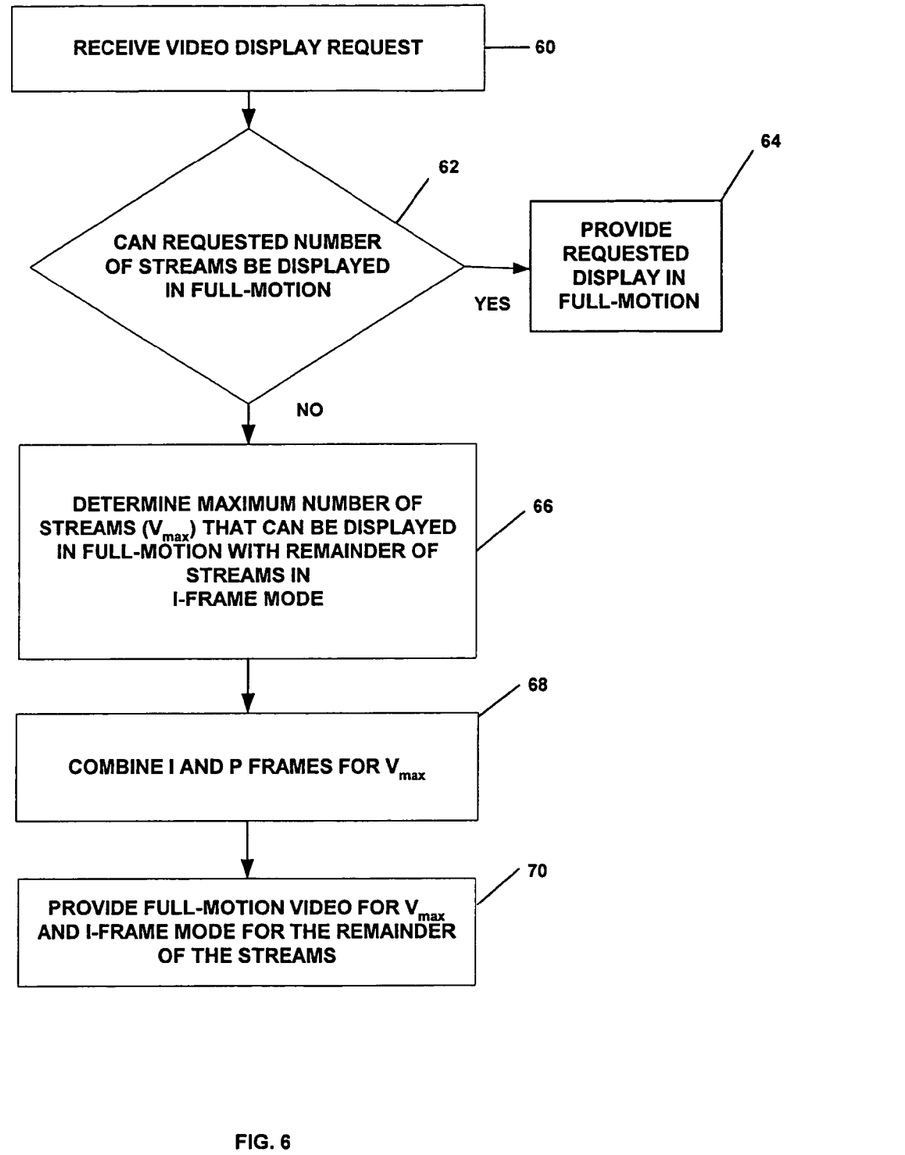
FIG. 6 is a flowchart of one embodiment of the process of the present invention.

FIG. 6 is a flowchart illustrating a first embodiment of the process of the present invention. At step 60 processor 30 receives a video display request from user input device 42 indicating the screen display desired by a user. At step 62 processor 30 determines if the number of streams requested by a user can be displayed in full-motion. If a user's request can be provided, then processor 30 provides the requested display in full-motion at step 64. If a user's request cannot be provided, then at step 66 processor 30 determines the maximum number of streams ($V_{max}$) that can be displayed in full-motion with the remainder of the streams being displayed in I-frame mode. At step 68, processor 30 combines the I and P frames for the frames that are to be displayed in full-motion. Processor 30 then provides the full-motion video for the $V_{max}$ streams and I-frame mode streams for the remainder of the streams.

Figure 7:
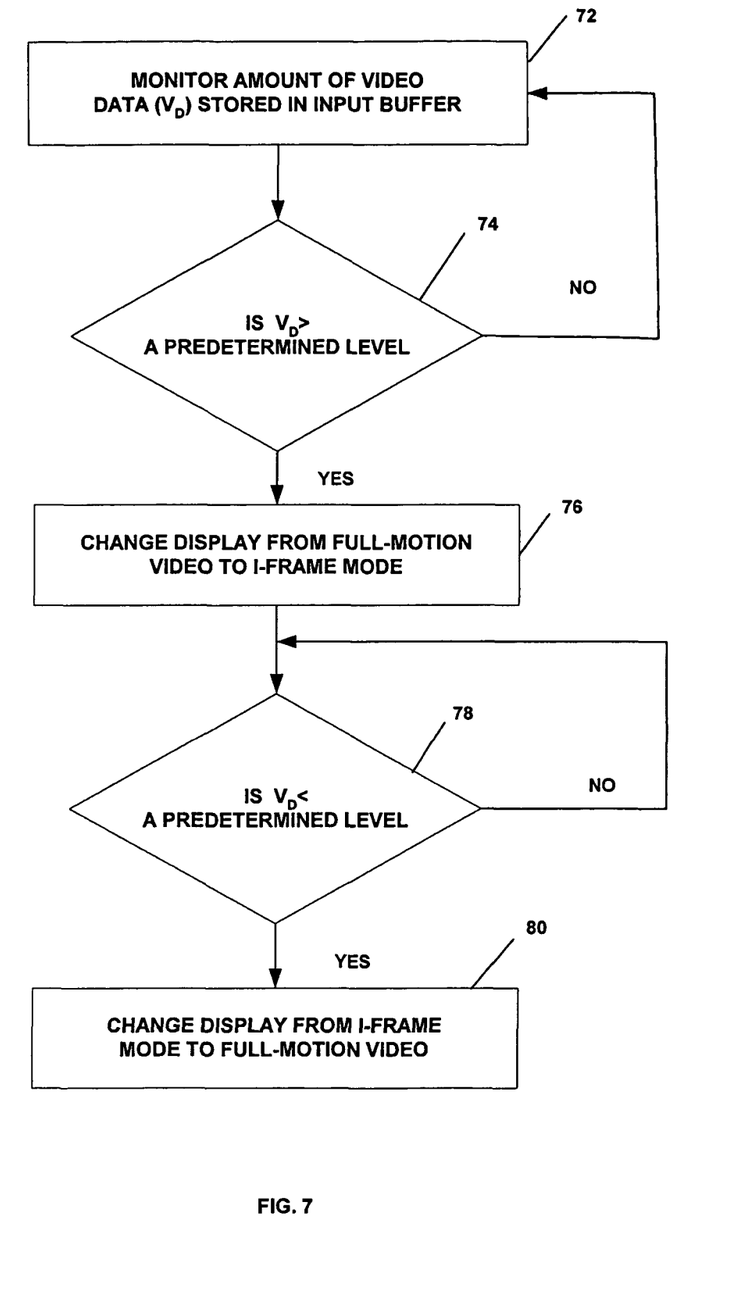
FIG. 7 is a flowchart of one embodiment of the process of the present invention.

In FIG. 7 another embodiment of the process of the present invention is illustrated. At step 72 in this embodiment, processor 30 monitors the amount of video data ($V_D$) stored in input buffer 32 and at step 74 compare the amount of stored video data to a predetermined level. The predetermined level is preferably chosen to allow enough storage capacity in input buffer 32 to accommodate a data burst from network 12 or an unexpected request from a user or for system processing. Processor 12 determines if it is falling behind in processing the incoming video streams by checking the filled level of input buffer 32 and determining the resource needed to process the data. If processor 30 determines that it is falling behind, then at step 76 processor 30 switches some or all of the video streams temporarily to I-frame mode until system resources can handle the incoming video streams. At step 78 processor 30 determines if $V_D$ is less than a predetermined level. When the system resources can handle the incoming video streams, processor 30 switches the display back to the original configuration as indicated by step 80. The predetermined level referred to in steps 74 and 78 can be identical or can be different to establish a range where the video stream continues to be displayed in I-frame mode until the amount of video data stored in input buffer 32 is less than the lower level of the range. Workstation 22 utilizes a lookup table to determine the amount of processing power required to be able to display each video stream at the requested resolution and frame rate. Preferably, the lookup table is created in advance of use of the workstation 22 although the following calculations can be made in real time. The lookup table can be stored, for example, in disk drive 40 for permanent storage and copied into RAM 36 during normal operation. The amount of processor usage at each resolution and frame rate is determined and stored in a lookup table so that the system can efficiently and quickly determine if the requested display can be provided or whether some or all of the quadrants have to be placed in I-frame mode, for example, by looking up the processor usage required by the display in each quadrant, adding these requirements to determine a total processor usage requirement, and comparing this to a predetermined level of allowed processor usage. It has been found that using the lookup table to calculate the processor usage is normally within plus or minus five percent of the actual measured value. In addition, it has been found that although there may be a difference in the video stream of a camera, for example, when the camera is viewing a blank wall versus a crowd of people, the difference is not significant in terms of the calculation of processor usage. Alternatively, the amount of processor usage at each resolution and frame rate can be determined in real-time by processor 30 rather than stored in a lookup table.

Figure 8:
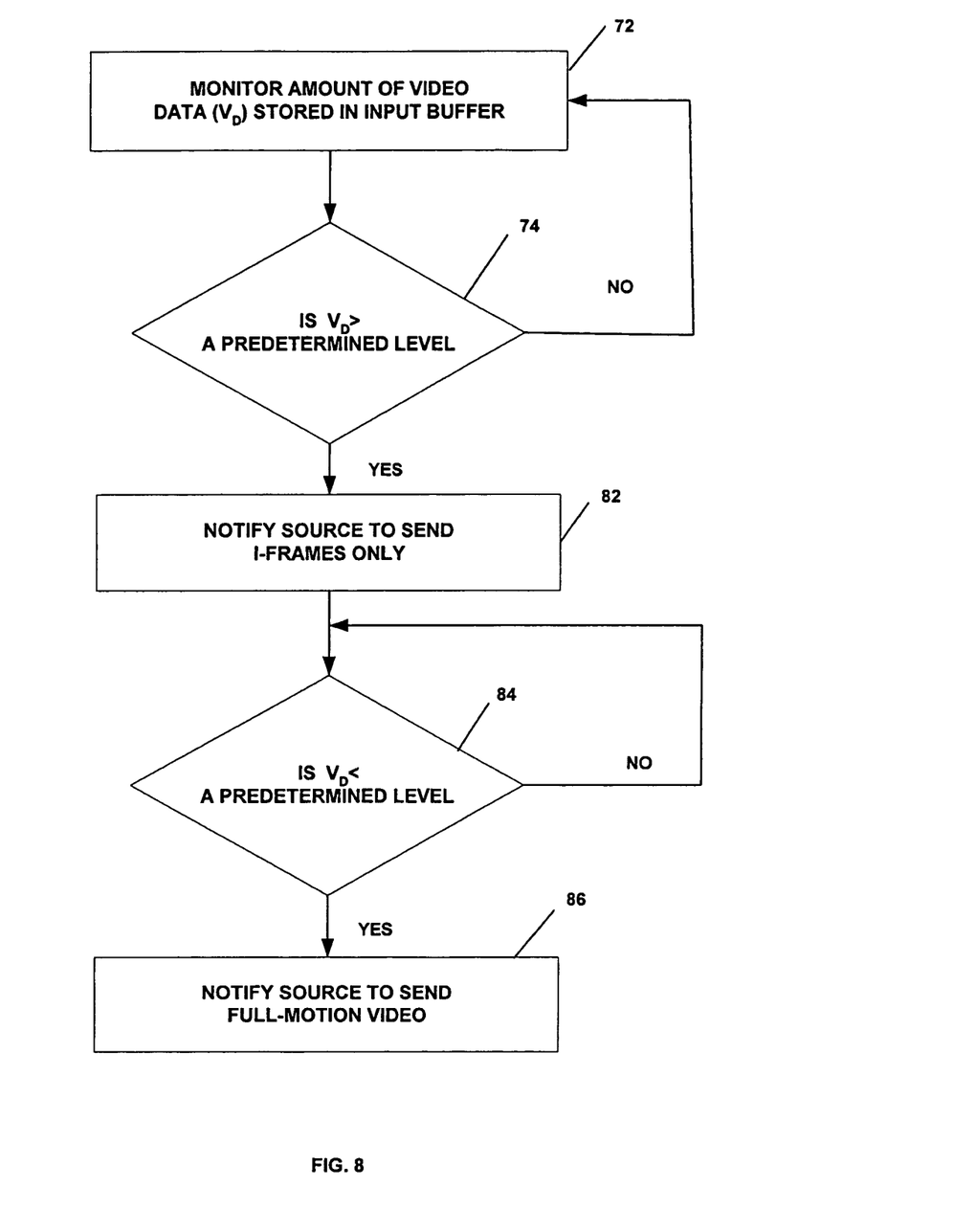
FIG. 8 is a flowchart of one embodiment of the process of the present invention.

In another aspect of the invention illustrated in FIG. 8, workstation 22 can communicate over network 12 and request that a source, such as source 14, send only I-frames when processor 30 of workstation 22 has determined that input buffer 32 is filled to a level that is greater than a predetermined level, which are determined by steps 72 and 74 as discussed above. When the level of input buffer 32 is greater than the predetermined value, processor 30 notifies the source to send only I-frames only as indicated at step 82. This predetermined level is chosen to ensure that the system does not crash as discussed above. In this case, encoder 26, which is connected to camera 24, decodes the MPEG4 video stream into (a) I-frames and (b) P-frames and B-frames or just P-frames as discussed above. Encoder 26 then sends only the I-frames over network 12 to workstation 22, thereby matching the video output stream to the current capability of workstation 22. Processor 30 continues to monitor the level of data stored in input buffer 32 at step 84. When processor 30 is again able to display the full-motion MPEG4 video on display 38, processor 30 sends a message or signal over network 12 to encoder 26 indicating that encoder 26 should now send the MPEG4 video stream rather than just the I-frames as indicated at step 86.

Figure 9:
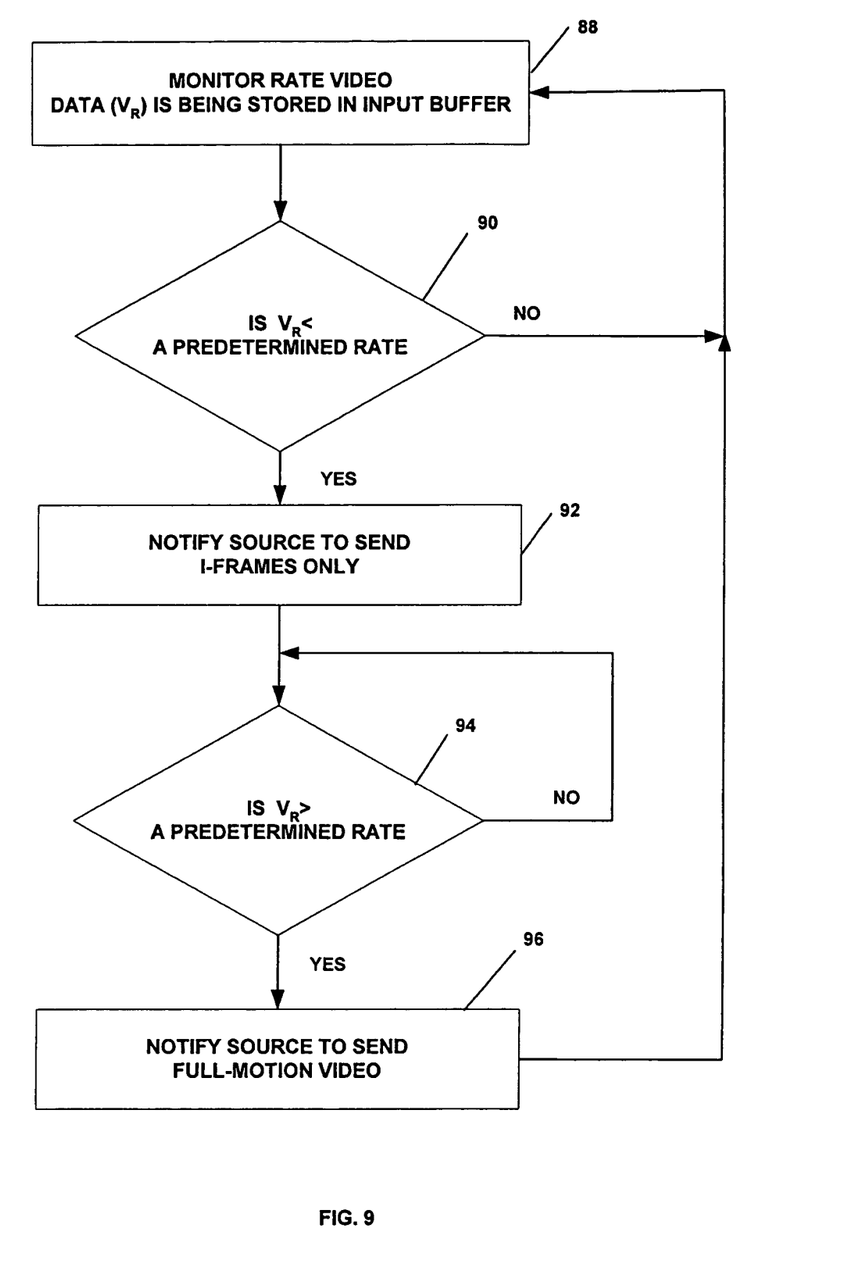
FIG. 9 is a flowchart of one embodiment of the process of the present invention.

In still another aspect of the invention illustrated in FIG. 9, workstation 22 can communicate over network 12 and request that a source, such as source 14, send only I-frames when processor 30 of workstation 22 has determined that there is congestion on network 12, such as when the input rate to input buffer 32 is less than a predetermined rate. At step 88, processor 30 monitors the rate video data ($V_R$) is being stored in input buffer 32. At decision point 90, processor 30 determines if $V_R$ is less than a predetermined rate. If $V_R$ is less than a predetermined rate, then at step 92 processor 30 notifies the source, such as source 14, to send I-frames only. In this case, encoder 26, which is connected to camera 24, decodes the MPEG4 video stream into (a) I-frames and (b) P-frames and B-frames or just P-frames as discussed above. Encoder 26 then sends only the I-frames over network 12 to workstation 22, thereby reducing the bandwidth required on network 12. At decision point 94, processor 30 determines if $V_R$ is greater than a predetermined rate, and if it is, processor 30 at step 96 notifies the source to send full-motion video. The predetermined level referred to in steps 90 and 94 can be identical or can be different to establish a range where the video stream continues to be displayed in I-frame mode until the rate of video data being stored in input buffer 32 is greater than the upper level of the range.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of controlling a video surveillance display Simultaneously displaying video data from a plurality of video sources, the method comprising:
   receiving a plurality of MPEG video streams comprising video data in I-frames and P-frames from plurality of a video sources;
   receiving user input comprising a selected set of a plurality of streams selected from the plurality of MPEG video streams to be displayed simultaneously on a display;
   receiving user input comprising the format in which each stream in the selected set of the plurality of streams is to be displayed simultaneously on the display with at least one of the streams in the selected set of the plurality of streams being displayed in full-motion Video;
   receiving the selected set of a plurality of streams in an input buffer;
   processing the selected set of the plurality of streams according to the received user input concerning the format in which the selected set of the plurality of streams are to be displayed to generate signals for display on the display;
   determining if the processor is falling behind in processing the selected set of the plurality of streams; and
   automatically controlling the format of the plurality of streams in the selected set of the plurality of streams according to available system resources by changing the format of some of the plurality of streams in the selected set of the plurality of streams from full-motion video to a mode in which only the I-frames of the some of the plurality of streams are displayed if the processor is falling behind in processing the selected set of the plurality of streams without changing the format of a remainder of the plurality of streams in the selected set of the plurality of streams, such that at least one stream in the selected set of the plurality of streams continues to be displayed on the display using full-motion video while the some of the plurality of streams in the selected set of the plurality of streams are switched to being displayed on the display using only I-frames simultaneously with the at least one stream displayed on the display using full-motion video.

2. A method as recited in claim 1 further comprising automatically changing a frame rate of one stream in the selected set of the plurality of streams from a first frame rate to a second frame rate with the second frame rate being slower than the first frame rate.

3. A method as recited in claim 1 further comprising automatically changing the format in a first stream in the selected set of the plurality of streams back to the previous format when the processor is not falling behind in processing the selected set of the plurality of streams.

4. A method as recited in claim 1 further comprising receiving a request to change the format of one of the selected set of the plurality of streams, determining if changing the format of the one of the selected set of the plurality of streams will cause the processor to fall behind in processing the selected set of a plurality of streams, and allowing the requested format change if the requested format change will not cause the processor to fall behind in processing the selected set of a plurality of streams.

5. A method as recited in claim 4 wherein said determining comprises referring to a lookup table to determine the amount of system resources required to display a video stream.

6. A method as recited in claim 4 wherein said determining comprises calculating in real-time the amount of system resources required to display a video stream.

7. A method as recited in claim 4 further comprising providing a signal to a source of an MPEG video stream instructing the source to provide only the I-frames of the MPEG video stream when the processor is falling behind in processing the selected set of the plurality of streams.

8. A method as recited in claim 7 further comprising providing a signal to the source of the MPEG video stream to provide I-frames and P-frames of the MPEG video stream when the processor is not falling behind in processing the selected set of the plurality of streams.

9. The method of claim 1, wherein automatically changing the format of the some of the plurality of streams in the selected set of a plurality of streams comprises:
   automatically changing the format of the some of the plurality of streams in the selected set of the plurality of streams from full-motion video to the mode in which only the I-frames of the some of the plurality of streams are displayed based on whether an amount of video data stored in the input buffer is greater than a predetermined level of video data and based on various determined total amounts of processor usage required to display each of the plurality of streams at various display modes available for each of the plurality of streams, such that the total amount of video data stored in the input buffer for the some of the plurality of streams with the changed format and for the remainder of streams in the selected set of the plurality of streams is not more than the predetermined level of video data, and such that the total processor usage required to display the some of the plurality of streams with the changed format and the remainder of streams in the selected set of the plurality of streams is not more than a predetermined level of allowed processor usage.

10. An apparatus for controlling a video surveillance display for simultaneously displaying video data from a plurality of video sources comprising:

an input for receiving a plurality of MPEG video streams comprising video data in I-frames and P-frames from a plurality of video sources;

an input for user input receiving a request identifying a selected set of a plurality of streams from the plurality of MPEG video streams to be displayed on a display;

an input for receiving user input identifying the format in which each of the selected set of the plurality of streams is to be displayed simultaneously on the display;

an input buffer for receiving the video data from said selected set of a plurality of streams, said input buffer being connected to said input for receiving a plurality of MPEG video streams; and a processor for processing the selected set of the plurality of streams according to received user input concerning the format in which the selected set of a plurality of streams are to be displayed to generate signals for display on the display and for determining if the processor is not falling behind in processing the selected set of the plurality of streams, said processor being adapted to automatically control the format of the plurality of streams in the selected set of the plurality of streams according to available system resources by changing the format of some of the plurality of streams in the selected set of the plurality of streams from full-motion video to a mode in which only the I-frames of the some of the plurality of streams are displayed if the processor is falling behind in processing the selected set of a plurality of streams without changing the format of a remainder of the plurality of streams in the selected set of the plurality of streams, such that at least one stream in the selected set of the plurality of streams continues to be displayed on the display using full-motion video while the some of the plurality of streams in the selected set of the plurality of streams are switched to being displayed on the display using only I-frames simultaneously with the at least one stream displayed on the display using full-motion video.

11. An apparatus as recited in claim 10 wherein said processor provides a signal to be sent to a source of an MPEG video stream instructing the source to provide only the I-frames of the MPEG video stream when the processor is not falling behind in processing the selected set of the plurality of streams.

12. An apparatus as recited claim 11 wherein said processor provides a signal to be sent to a source of an MPEG video stream to provide I-frames and P-frames of the MPEG video stream when the processor is not falling behind in processing the selected set of the plurality of streams.

13. An apparatus as recited in claim 10 wherein said processor is adapted to automatically change a frame rate of one stream in the selected set of the plurality of streams from a first frame rate to a second frame rate with the second frame rate being slower than the first frame rate.

14. An apparatus as recited in claim 10 further comprising input to receive a request to change the format of one stream in the selected set of the plurality of streams and wherein said processor is adapted to determine if changing the format of the one stream in the selected set of the plurality of streams will cause the processor to fall behind in processing the selected set of the plurality of streams and to allow the requested format change if the requested format change will not cause the processor to fall behind in processing the selected set of the plurality of streams.

15. An apparatus as recited in claim 14 wherein said processor refers to a lookup table to determine the amount of system resources required to display a video stream.

16. An apparatus as recited in claim 10 wherein said processor is adapted to automatically change the format in a first stream in the selected set of streams back to the previous format when the processor is not falling behind in processing the selected set of the plurality of streams.

* * * * *